United States Patent [19]
Heitmann et al.

[11] 4,340,317
[45] Jul. 20, 1982

[54] SPLINELESS COUPLING MEANS

[75] Inventors: Arnold M. Heitmann, Swampscott; Richard E. Lord, Jr., Randolph, both of Mass.

[73] Assignee: Northern Research & Engineering Corp., Woburn, Mass.

[21] Appl. No.: 261,730

[22] Filed: May 7, 1981

[51] Int. Cl.³ .............................. F16D 1/06; F16B 35/00
[52] U.S. Cl. ........................................ 403/25; 403/260; 416/244 A
[58] Field of Search ............... 403/260, 259, 261, 359, 403/25; 416/244 A, 244 B

[56] References Cited
U.S. PATENT DOCUMENTS

| | | | |
|---|---|---|---|
| 2,577,134 | 12/1951 | Land | 403/359 X |
| 2,602,683 | 7/1952 | Aue | 403/259 |
| 2,843,311 | 7/1958 | Buchi | 416/244 A X |
| 3,582,116 | 6/1971 | Young | 403/359 |
| 3,936,926 | 2/1976 | Hornschuch | 416/244 A X |
| 4,131,420 | 12/1978 | Miller | 403/359 X |

Primary Examiner—Andrew V. Kundrat
Attorney, Agent, or Firm—David W. Tibbott; Bernard J. Murphy

[57] ABSTRACT

In the first embodiment, the invention comprises an imperforate turbine wheel having a hub of polygonal cross-section engageable with a hollow shaft of polygonal conformation, and a thrust collar and bolt for fastening the shaft and wheel together.

3 Claims, 4 Drawing Figures

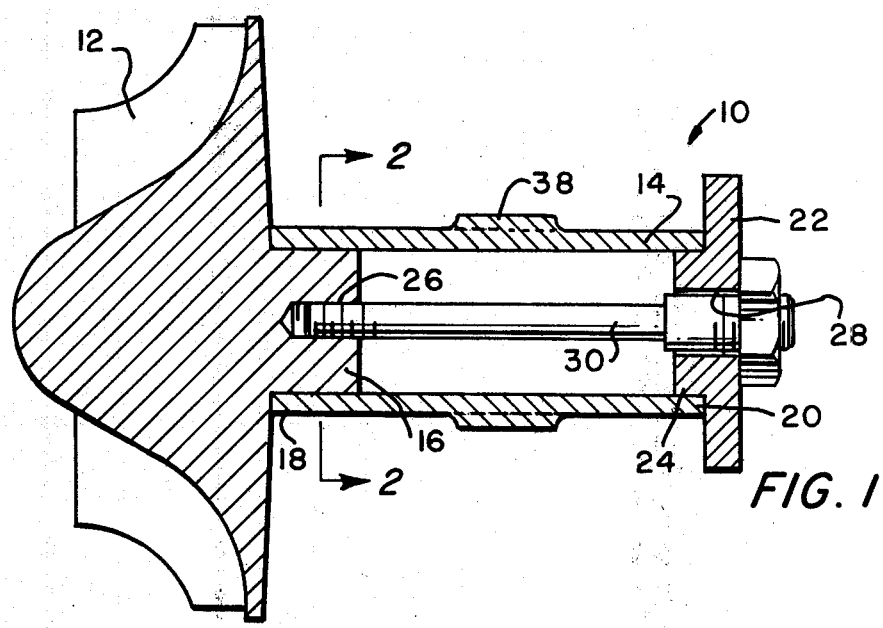
FIG. 1
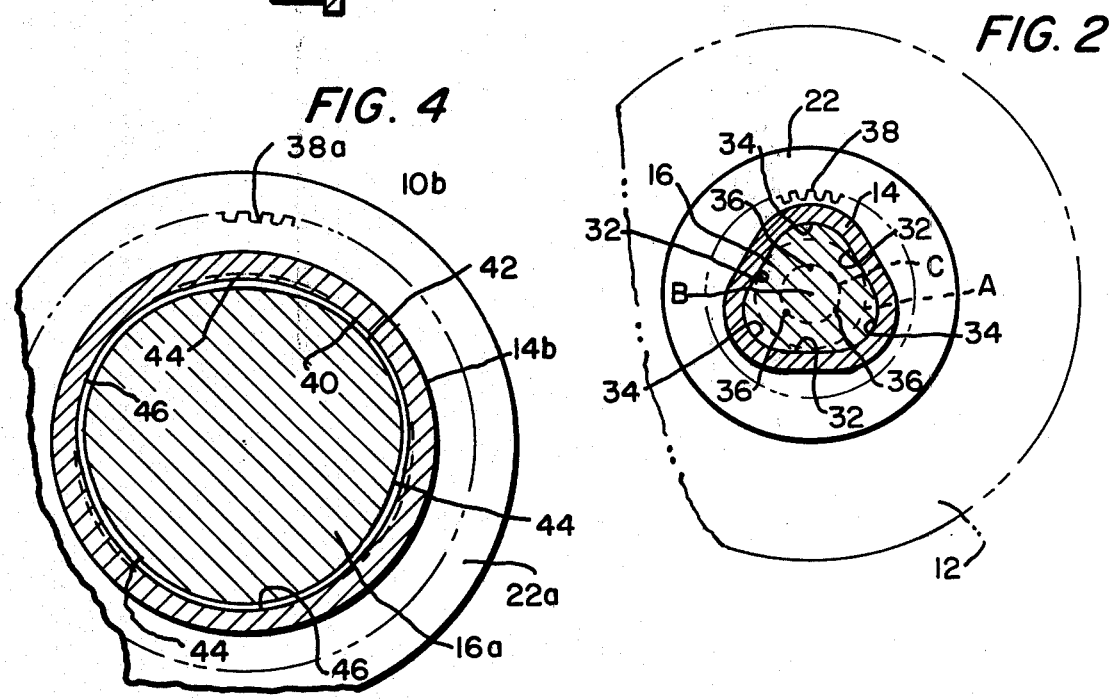
FIG. 4
FIG. 2

SPLINELESS COUPLING MEANS

The Government has rights in the invention pursuant to Contract No. DE-AC03-79ET-15426 awarded by the U.S. Department of Energy.

This invention pertains to shafts, axles, and the like, and to other machine elements such as pulleys, gears, wheels and the like which may be coupled or mated thereto for transmission of rotation therebetween.

Heretofore it has been the common practice to use splines, keys or the equivalent to retain such parts in fixed angular relation to each other, and consequently costly machining operations have been required. Moreover, with splines or keys the perimeters of the shaft or axle, etc., and of the bore of its mating element change abruptly in outline with the result that torsional stresses are concentrated or localized at regions where there are discontinuities. At these same regions, there is a marked tendency to fracture during heat-treating operations, such as hardening. The spline or key construction has a further disadvantage when, as in selective gear transmission, there is relative sliding movement of the mated parts because in such cases the sharp edges of the splines or keys scrape lubricant from the coacting surfaces.

In accordance with some prior art, notably U.S. Pat. No. 2,397,382, issued to J. E. Smith, on Mar. 26, 1946, for a "Locking Device", and U.S. Pat. No. 3,936,926, issued to H. Hornschuch, on Feb. 10, 1976, for a "Method of Coupling Compressor Impellers and Shafts", the perimeters of the shaft and of the bore of its mating wheels, pulley, gear or the like are are out-of-round or non-circular, and smoothly continuous, with the result that operating stresses and distributed and tendency to crack during heat-treatment is eliminated. The avoidance of sharp edges or corners on the mating surfaces also insures freedom from oil-scraping action when the parts are moved relative to each other along the axis of their rotation, if need be.

These prior art practices are commendable, however, they require that the shaft or axle, or whatever, penetrate the mating element. It is thoughtful to dispense with splining or keying arrangements, to avoid deleterious stresses as can arise therefrom. It begs the question, however, as to how to avoid the doubling of centrifugal stresses as can arise from a bore or perforation, when formed in the mating element, to receive the shaft.

Well, it is an object of this invention to set forth a splineless coupling means which avoids the aforesaid stresses. It is an object of this invention to disclose a novel splineless coupling means in which the shaft does not penetrate the mating element—a means in which the mating element has no bore or perforation in which to receive the shaft. Particularly it is an object of this invention to set forth, in combination, a splineless coupling means, comprising an imperforate, first member, rotatable about an axis, engageable with a second member for transmission of rotation therebetween from one of said members to the other thereof; wherein said first member has a prominent structure, defining a boss or hub or the like; said structure is of non-circular cross-section, and has a peripheral surface, circumjacent said axis; and a second member, also rotatable about said axis, engageable with said first member for transmission of rotation therebetween, as aforesaid; wherein said second member has a void formed therein defined by an inner surface of a circumscribing wall; and said inner surface has a non-circular conformation, corresponding to said non-circular cross-section, for defining an intimately-interfaced coupling engagement thereof with said cross-section; and means for securing said wall and structure together in fast, coupled engagement.

Further objects of the invention, as well as the novel features thereof, will become more apparent by reference to the following description taken in conjunction with the accompanying figures, in which:

FIG. 1 is a cross-sectional view of an embodiment of the invention taken along the axis thereof;

FIG. 2 is a cross-sectional view taken along section 2—2 of FIG. 1;

FIG. 4 is a cross-sectional view, like that of FIG. 2, of a further alternative embodiment of the invention.

Figure 3:
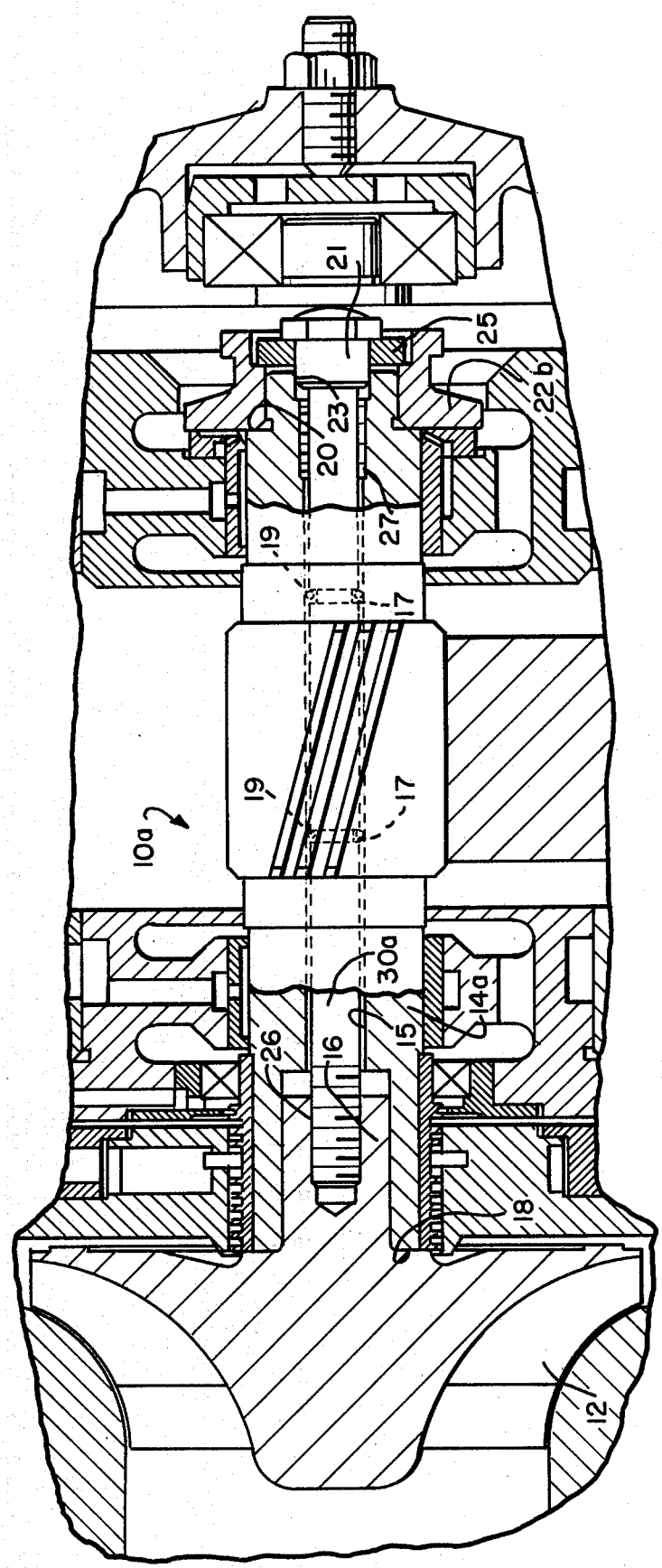
FIG. 3 is a cross-sectional view, like that of FIG. 1, of an alternate embodiment of the invention.

As shown in the figures, a first embodiment 10 of the novel coupling means comprises a turbine wheel 12 and a hollow shaft 14. Wheel 12 has a hub 16 projecting therefrom of polygonal cross-section, and the shaft 14 is also of a same, polygonal configuration. An end 18 of shaft 14 engages the hub 16, and the two elements define an interfaced coupling engagement. Now, means are provided to secure the coupled elements in engagement.

Shaft 14 is polygonal fully along its length, and the opposite end 20 thereof receives a thrust collar 22. Collar 22 has a prominent land 24 which is of the identical polygonal cross-section as hub 16. End 20 and land 24 also define an interfaced coupling engagement.

About the axial centerline thereof, hub 16 has a short, threaded bore 26. Collar 22 has an aperture 28 formed through the center thereof. A headed bolt 30 is passed into the aperture 28 and through the shaft 14 threadedly to engage the bore 26. Upon the bolt 30 being fastened, the wheel 12, shaft 14, and collar 22 comprise a rigid, integral assembly.

The inner surface of the shaft 14, as well as the perimeters of the hub 16 and the land 24, is defined by three flat sides 32 tangent to a base circle "A" the center of which is on the axis "B" of rotation, and by three arcuate sides 34, each tangent to two of the flat sides 32. The centers 36 of curvature of sides 34 lie on a second circle "C" concentric with the base circle.

Intermediate the length of shaft 14 is an integral gear 38 from which rotary power of the wheel 12 and shaft 14 can be transmitted.

Note that, according to our teaching, the wheel 12 is left imperforate. There obtains only the short-length, threaded bore 26 in the outermost end of the hub 16. Accordingly, the wheel has to encounter substantially none of the aforementioned stresses. Further, our coupling means 10 is of lightweight, albeit rugged construction; this is due, principally, to the polygonal configuration and hollowness of the shaft 14.

The embodiment 10a of the invention shown in FIG. 3 is similar to that of FIGS. 1 and 2; it has a few refinements, however. Shaft 14a has a bore 15 formed therein which defines a close clearance with the shank of the bolt 30a. Accordingly, the bolt has a pair of annular grooves 17 which nest O-rings 19. The latter dampen out any vibrations of bolt 30a.

Bolt 30a has a secondary, pilot head 21 which is engaged with an axially-centered recess 23 formed in the shaft 14a. A hardened washer 25 is fitted about the pilot head 21. The pilot head 21 keeps the bolt 30a concentric with the shaft 14a, and keeps the washer 25 concentric with the bolt 30a. The washer 25 takes the axial load of the bolt 30a.

The shaft 14a has a tapped counterbore 27 in the thrust collar-receiving end thereof. Bore 27 is provided to receive a jacking bolt, if necessary, to effect disengagement of the shaft 14a from the wheel 12.

The invention is not limited to the use of a polygonal configuration of the hub 16 and shafts 14 and 14a. It is possible to practice the invention with configurations which are, for example, square, pentagonal or hexagonal, with the flat sides thereof smoothly joined by arcuate sectors or sides tangent thereto.

The alternative embodiment 10b of FIG. 4 comprises a practice in which it is unnecessary to fix the hub 16a and shaft 14b together by the application of heat or with an interference fit.

The hub 16a and the shaft 14b are eccentric. (The dotted line represents a true circle). The eccentric inside diameter 40 of the shaft 14b corresponds substantially with the eccentric outside diameter 42 of the hub 16a. The eccentricity of the shaft 14b and hub 16a is defined by three eccentric, interfacing surfaces generally indicated by the index number 44, and three eccentric lobes or lobe-receiving recesses 46. With the shaft 14b and hub 16a aligned, lobe-for-lobe, the two elements are freely, slidably engageable. Then, by forceably, rotationally torquing the two, relative to each other, a binding, circumferentially wedged fit is achieved. Then, again, it remains only to employ a collar and bolt (such as collar 22 and bolt 30) to fix the two coupled elements together against axial separation. The circumferential wedging, of course, is overcome simply by forceably, rotationally un-torquing the elements. With the collar and bolt removed, and the element "un-torqued", they can be freely, slidably separated.

While we have described our invention in connection with specific embodiments thereof, it is to be clearly understood that this is done only by way of example and not as a limitation to the scope of our invention as set forth in the objects thereof and in the appended claims.

I claim:

1. In combination, splineless coupling means, comprising:

an imperforate first member, rotatable about an axis, engageable with a second member for transmission of rotation therebetween from one of said members to the other thereof; wherein said first member has a prominent structure, defining a boss or hub or the like;

said structure is of non-circular cross-section, and has a peripheral surface, circumjacent said axis; and a second member, also rotatable about said axis, engageable with said first member for transmission of rotation therebetween, as aforesaid; wherein said second member has a void formed therein defined by an inner surface of a circumscribing wall; and said inner surface has a non-circular conformation, corresponding to said non-circular cross-section, for defining an intimately-interfaced coupling engagement thereof with said cross-section; and means for securing said wall and structure together in fast coupled engagement; wherein said second member is an elongate element;

said element is hollow fully throughout the length thereof;

said structure has a threaded bore formed therein;

said securing means comprises (a) an apertured thrust collar for engaging a first end of said second member and (b) a headed bolt for penetrating and engaging said collar, extending through said hollow toward the opposite end of said second member, and threadedly engaging said bore;

said collar has a substantially annular land formed thereon for engaging said first end of said second member; and said land is of non-circular cross-section, corresponding to said non-circular conformation of said inner surface of said second member to define an intimately-interfaced coupling engagement thereof with said inner surface.

2. The combination, splineless coupling means, according to claim 1, wherein:

said second member has means thereon, intermediate the length thereof, for receiving thereat, and for imparting therefrom, a rotary drive force.

3. The combination, splineless coupling means, according to claim 2, wherein:

said drive force receiving and imparting means comprises a gear.

* * * * *